(12) United States Patent
Huang

(10) Patent No.: US 8,703,861 B2
(45) Date of Patent: Apr. 22, 2014

(54) STREAK-FREE TIRE DRESSING

(75) Inventor: Tsao-Chin Clarence Huang, Katy, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 52 days.

(21) Appl. No.: 13/586,240

(22) Filed: Aug. 15, 2012

(65) Prior Publication Data

US 2013/0115377 A1 May 9, 2013

Related U.S. Application Data

(60) Provisional application No. 61/557,860, filed on Nov. 9, 2011.

(51) Int. Cl.
| C08L 83/00 | (2006.01) |
| C09B 67/00 | (2006.01) |
| C11D 3/37 | (2006.01) |
| C11D 17/08 | (2006.01) |
| H05K 3/00 | (2006.01) |

(52) U.S. Cl.
USPC ........... 524/506; 524/502; 510/244; 510/189; 510/417; 510/432; 510/466; 427/96.6; 427/384; 427/387; 428/405; 428/447

(58) Field of Classification Search
USPC ................. 524/506, 502; 427/96.6, 384, 387; 510/244, 189, 417, 432, 466; 428/405, 428/447
See application file for complete search history.

(56) References Cited

U.S. PATENT DOCUMENTS

| 2,592,069 A | 4/1952 | Reid |
| 2,803,615 A | 8/1957 | Ahlbrecht |
| 2,826,564 A | 3/1958 | Bovey |
| 2,995,542 A | 8/1961 | Brown |
| 3,081,274 A | 3/1963 | Heine |
| 3,102,103 A | 8/1963 | Ahlbrecht |
| 3,291,843 A | 12/1966 | Fritz |
| 3,304,278 A | 2/1967 | Hauptschein |
| 3,325,163 A | 6/1967 | Off |
| 3,574,791 A | 4/1971 | Sherman |
| 3,787,351 A | 1/1974 | Olson |
| 3,956,174 A | 5/1976 | Palcher |
| 4,600,436 A | 7/1986 | Traver |
| 4,790,877 A | 12/1988 | Vadasz |
| 4,795,793 A | 1/1989 | Amimoto |
| 4,880,557 A | 11/1989 | Ohara |
| 4,999,398 A | 3/1991 | Graiver |
| 5,057,572 A | 10/1991 | Chrobaczek |
| 5,077,040 A | 12/1991 | Bergmann |
| 5,183,845 A | 2/1993 | Parkinson |
| 5,244,598 A | 9/1993 | Merrifield |
| 5,326,483 A | 7/1994 | Halloran |
| 5,378,271 A | 1/1995 | Arimoto |
| 5,507,969 A | 4/1996 | Shinohara |
| 5,525,427 A | 6/1996 | Griswold |
| 5,578,298 A | 11/1996 | Berthiaume |
| 5,623,017 A | 4/1997 | Hill |
| 5,661,208 A | 8/1997 | Estes |
| 5,759,983 A | 6/1998 | Mondin |
| 6,013,323 A * | 1/2000 | Klayder et al. ............... 427/384 |
| 6,071,975 A | 6/2000 | Halloran |
| 6,080,387 A | 6/2000 | Zhou |
| 6,147,078 A | 11/2000 | Sanderson |
| 6,153,569 A | 11/2000 | Halloran |
| 6,180,117 B1 | 1/2001 | Berthiaume |
| 6,221,811 B1 | 4/2001 | Policello |
| 6,221,833 B1 | 4/2001 | Colurciello, Jr. |
| 6,506,715 B1 | 1/2003 | Schultz |
| 6,602,835 B2 | 8/2003 | Schmeida |
| 8,168,578 B2 * | 5/2012 | Serobian ....................... 510/244 |

FOREIGN PATENT DOCUMENTS

EP          0588326 A2     6/1997

* cited by examiner

*Primary Examiner* — Michael Bernshteyn
(74) *Attorney, Agent, or Firm* — Blue Filament Law PLLC; Avery N. Goldstein

(57) ABSTRACT

A tire dressing composition is provided that includes at least one silicone fluid having a viscosity of between 40 and 500,000 centiStokes at room temperature. A fluorinated acrylate polymer is provided in the composition to limit the amount of streaking in a coating formed from the composition upon application to a tire surface. The coating is formed through the evaporation of a solvent in the composition containing the at least one silicone fluid and the fluorinated acrylate polymer. A process is provided for dressing a tire having a previous silicone coating thereon, the process including applying the tire dressing composition and allowing the solvent to evaporate from the composition to form a tire dressing coating. The coating producing an initial gloss of greater than 110 units. A gloss of greater than 110 units is maintained for at least two weeks subsequent to the application under normal vehicle operation conditions.

15 Claims, No Drawings

STREAK-FREE TIRE DRESSING

RELATED APPLICATIONS

This application is a non-provisional application that claims priority benefit to U.S. Provisional Application Ser. No. 61/557,860 filed on 9 Nov. 2011; the contents of which are hereby incorporated by reference.

FIELD OF THE INVENTION

The present invention in general relates to a tire dressing composition and the use thereof and in particular, to such a composition amenable to application to the tires of various vehicles to provide a high gloss and streak-free appearance.

BACKGROUND OF THE INVENTION

As the mileage on a tire increases, the sidewall rubber surfaces often become dull and unattractive. This is due to various causes including wind, weather, sunlight, scratching, abrasion from dirt, and other chemical and physical reactions. Many products are available today on the market for tire dressing usage to address these adverse effects. Many of these tire dressing products restore older appearance from a dull, weathered appearance to a shiny, bright, and like-new condition. For example, conventionally a dispersion of the silicone fluids in petroleum distillates, or a conventional oil in water silicone emulsion system with milky or opaque appearance are often used to restore the attractive, bright, shiny, and like-new appearance on the tire surface. Typically, conventional tire dressing formulas for dressing and appearance applications are products containing both high viscosity and low viscosity silicone fluids blended in petroleum distillates or products containing silicone emulsions prepared in aqueous systems with a milky white and opaque appearance. When applied to a tire surface, the silicone composition forms a coating which develops a desired shiny appearance due to the unique structure of the silicone layer formed on the tire surface.

A solution or dispersion of silicone oil or wax in an organic solvent and an aqueous emulsion prepared therefrom with the aid of a surfactant are also generally employed as tire dressing agents. However, while these polishing agents impart good gloss and acceptable water repellency to tires, they are readily stripped from the tire surface by rain and dust so that the effects are relatively transitory or short-lived.

In addition, aqueous-based tire dressings typically show poor adherence to the surface of tires because of the low surface energy of the surface relative to the surface energy of the aqueous compositions. As a result, most of the existing tire dressing products on the market use an organic solvent-based system, with silicone fluids dispersed in the hydrocarbon solvent, having a lower surface energy than the tire surface.

Improved adhesion has been obtained with silicone based tire dressing compositions that include a silicone microemulsion and a wetting agent, as for example detailed in U.S. Pat. No. 7,074,262. However, this product and other conventional products tend to streak when applied to tire surfaces having residual silicone on them. Such streaking not only detracts from the visual appearance the tire dressing, but also owing to the lack of tire dressing coating uniformity tends to limit not only the gloss but the coating operational lifetime on the surface of a tire.

Thus, there exists a need for a tire dressing composition that is amenable to a spray application to a tire surface that overcomes the streaking associated with conventional tire dressing compositions. There also exists a need for a process to apply such a composition to provide a high gloss protective dressing coating to a tire surface.

SUMMARY OF THE INVENTION

A tire dressing composition is provided that includes at least one silicone fluid having a viscosity of between 40 and 500,000 centiStokes at room temperature. A fluorinated acrylate polymer is provided in the composition to limit the amount of streaking in a coating formed from the composition upon application to a tire surface. The coating formed through the evaporation of a solvent in the composition containing the at least one silicone fluid and the fluorinated acrylate polymer.

A process is provided for dressing a tire having a previous silicone coating thereon, the process including applying the tire dressing composition and allowing a solvent to evaporate from the composition to form a tire dressing coating. Preferably, the coating producing an initial gloss of greater than 110 units. A gloss of greater than 110 units is maintained for at least two weeks subsequent to the application under normal vehicle operation conditions.

A tire dressing composition is provided that includes at least one silicone fluid having a viscosity of between 40 and 500,000 centiStokes, as measured at room temperature. A fluorinated acrylate polymer is provided in the composition to inhibit streaking in a coating produced from the composition upon drying as well as to extend the shine of the resulting coating. An organic solvent is present in which the silicone fluid and fluorinated acrylate polymer are dissolved or suspended.

A process of dressing a tire involves allowing the composition to dry in contact with a tire surface. The dried coating that results has a shine greater than 180 gloss units.

DETAILED DESCRIPTION OF THE PREFERRED EMBODIMENTS

The present invention has utility as a tire dressing composition and a process for a use thereof to protect, and impart gloss and water repellency to a tire so treated. An inventive tire dressing composition forms a durable high gloss water repellant coating on a tire that is resistant to water and detergent exposure. A surprising attribute of the present invention is that through the inclusion of a fluorinated acrylate polymer, a coating produced from an inventive tire dressing composition has improved gloss and is streak-free. The resulting coating also has superior adhesion to a silicone coating existing on the tire to which an inventive coating adheres. An inventive tire dressing composition is readily applied by a vehicle owner through resort to a convention trigger spray application, propellant aerosol, or a sponge or cloth for wipe application onto the tire surface.

An inventive tire dressing composition includes at least one silicone fluid having a viscosity of between 40 and 500,000 centiStokes, as measured at room temperature. Suitable silicone fluids operative herein illustratively include polydialkylsiloxanes where the alkyl is in each instance a $C_1$-$C_4$ such as polydimethylsiloxane, and the methyl groups along the chain can be substituted by many other groups, e.g., phenyl, vinyl, or trifluoropropyl. Representative silicone fluids operative herein and conventional to the art are detailed in the U.S. Pat. Nos. 6,602,835; 6,506,715; 6,221,833; 6,221,811; 6,180,117; 6,153,569; 6,147,078; 6,080,387; 6,071,975; 6,013,323; 5,759,983; 5,661,208; 5,623,017; 5,578,298;

5,525,427; 5,507,969; 5,378,271; 5,326,483; 5,244,598; 5,183,845; 5,077,040; 5,057,572; 4,999,398; 4,880,557; 4,790,877; 4,600,436; and 3,956,174. In a preferred embodiment, the at least one silicone fluid includes two silicone fluids of varying molecular weight. For example, a first silicone fluid has a viscosity of between 40 and 5,000 centiStokes while a second silicone fluid is employed with a molecular weight of between 5,000 and 500,000 centiStokes. It is appreciated that the molecular weights and film forming properties of the high viscosity and low viscosity silicone materials function synergistically to provide an overall high quality coating from an inventive composition. Without intending to be bound by a particular theory, it is believed that a low molecular weight silicone fluid tends to stay liquid and readily sprayable and affords durability and a high gloss coating to the tire surface. The high molecular weight silicone fluid tends to have a degree of tack that promotes adhesion to the tire surface itself or a base silicone material preexisting on the tire surface. By way of example, a 1,000 centiStokes polydimethylsiloxane polymer and a 100,000 centiStokes polydimethylsiloxane polymer in combination interact to form a coating on a tire surface that has high gloss, durability and good sprayability properties, as applied through a trigger sprayer or soft cloth application. At least one silicone fluid of an inventive tire dressing composition is typically present in the composition in an amount of between 5 and 60 total weight percent and preferably between 10 and 30 total weight percent. In instances when the at least one silicone fluid includes two silicone fluids that vary in viscosity, the ratio of lowest viscosity silicone fluid: highest viscosity silicone fluid range from 0.2-5:1 by weight with the exact ratio of silicone fluids being determined by factors that include in part viscosity of the specific silicone fluids, viscosity differential between the various silicone fluids present, total weight percent of silicone fluids in the composition, and the chemical structure of various silicone fluids.

In order to inhibit streaking in a dressing produced by an invention formulation, a fluorinated acrylate polymer is provided. It is appreciated that the application of a fluorinated acrylate polymer either applied prior to, or as a component of an inventive tire dressing composition and is noted to level the resultant coating and improve the film forming characteristics on the tire surface. As a result, streaking is inhibited and the gloss and resiliency of the resultant film are improved.

A fluorinated acrylate polymer operative herein has the formula:

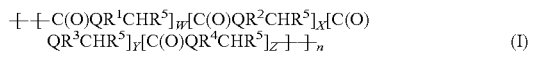

$$\{[-C(O)QR^1CHR^5]_w[C(O)QR^2CHR^5]_x[C(O)QR^3CHR^5]_y[C(O)QR^4CHR^5]_z\}_n \quad (I)$$

where $R^1$, $R^2$, $R^3$ and $R^4$ are each independently H, OH, $C_1$-$C_{24}$ alkyl, $C_1$-$C_{24}$ fluoroalkyl, $C_1$-$C_{24}$ perfluoroalkyl, with the proviso that the fluorinated acrylate polymer (I) has present at least one of $R^1$-$R^4$ is the $C_1$-$C_{24}$ fluoroalkyl or the C1-C24 perfluoroalkyl; Q is —O—, —O—$R^6$, or a nullity (no group between the carbonyl carbon and one of $R^1$-$R^4$); $R^5$ is either H or $CH_3$; $R^6$ is —$SO_2NR^5(CH_2)_mO(O)C$—, —$CONR^5(CH_2)_mO(O)C$—, —$(CH_2)_mO(O)C$—, —$CH_2CH(OH)(CH_2)O(O)C$—, —$CH_2CH(OR^5)(CH_2)O(O)C$—, —$(CH_2)_mC(O)O$—, —$(CH_2)_mSC(O)$—, —$(CH_2)_mO(CH_2)_mO(O)C$—, —$(CH_2)_mS(CH_2)_mO(O)C$—, —$(CH_2)_mO(OCH_2CH_2)_mO(O)C$—, —$(CH_2)_m(SO_2)$—; W, X, Y, and Z are each independently an integer value of between 0 and 50 inclusive, n is an integer value between 1 and 80; and m is an integer value between 1 and 12.

Preferably, at least one of $R^1$-$R^4$ is the $C_1$-$C_{24}$ perfluoroalkyl. Preferably, the $C_1$-$C_{24}$ perfluoroalkyl is $C_8$-$C_{20}$. More preferably, the perfluoroalkyl is $C_8$-$C_{16}$.

Preferably, between 5 and 30 percent of fluorinated acrylate polymer (I) is fluorine by weight.

The polymer backbone (I) is readily terminated by conventional moieties such as hydrogen, aliphatics, amines, sulfonates, and esters.

Preferably, at least one of $R^1$-$R^4$ is H, OH, or $C_1$-$C_{24}$ alkyl, while still maintaining an overall amount of between 5 and 30% fluorine by weight in the polymer formula (I).

Each of $R^1$-$R^4$ is a straight chain, branch chain, or cyclic fluorinated alkyl group, or a combination thereof. Each of $R^1$-$R^4$ is preferably free polymerizable olefinic unsaturation. $R^1$-$R^4$ in each instance optionally and independently contains a heteroatom such as oxygen, divalent sulfur, anamine nitrogen, an aliphatic, or a combination of hydrogen and aliphatic moieties to satisfy the valiancy of such a heteroatom. Regardless of the specifics of the fluorinated acrylate polymer (I), the polymer is required to form a colloid or solution with an organic solvent and preferably a VOC exempt organic solvent such as a chemical compound or mixture that contains at least one carbon atom and meets one of the following: (1) has a vapor pressure less than 0.1 mmHg at 20° C., as determined by ARB Method 310; or (2) is a chemical compound with more than 12 carbon atoms, or a chemical mixture comprised solely of compounds with more than 12 carbon atoms, and the vapor pressure is unknown; or (3) is a chemical compound with a boiling point greater than 216° C. as determined by ARB Method 310; or (4) is the weight percent of a chemical mixture that boils above 216° C., as determined by ARB Method 310. More preferably, a fluorinated acrylic polymer (I) is capable of suspension or solution in a suitable organic solvent in an amount of greater than 0.5 total solution weight percent. Preferably, the polymer (I) is suspendable or dissolvable in a solvent to an amount of between 1 and 40 total weight percent of solution. More preferably, the polymer (I) has terminal or pendent groups allowing for cure at 20° C. in ambient air.

A polyacrylate polymer (I) is prepared, for example, by free radical initiated copolymerization of a fluoroaliphatic radical-containing acrylate with a poly(oxyalkylene) monoacrylate or diacrylate or mixtures thereof. The molecular weight of the polyacrylate polymer is controlled by adjusting the concentration and activity of the initiator, concentration of monomers, and temperature, and by chain-transfer agents, such as thiols, e.g. n-octyl mercaptan. Fluoroaliphatic acrylates are known in the art as detailed in U.S. Pat. Nos. 2,803,615; 2,826,564; 3,102,103; and 3,304,278. The poly (oxyalkylene) acrylates used in the above preparation, and other acrylates useful for such purposes, can be prepared from commercially available hydroxy and alkoxy poly(oxyalkylene) materials, such as those sold under the trademarks PLURONIC, CARBOWAX, NECKS, and TRITON, through reaction of the hydroxylated materials with acrylic acid, methacrylic acid, acryloyl chloride, or acrylic anhydride.

Other fluoroaliphatic radical-containing terminally ethylenically unsaturated monomers suitable for the preparation of the polymers of this invention are readily produced by copolymerizing with corresponding poly(oxyalkylene)-containing, terminally ethylenically unsaturated comonomers, as detailed in U.S. Pat. Nos. 2,592,069; 2,995,542; 3,081,274; 3,291,843; and 3,325,163; and the ethylenically unsaturated materials suitable for providing fluoroaliphatic radical-containing structural units disclosed in U.S. Pat. No. 3,574,791. The fluorochemical acrylate polymers may also optionally contain units derived from other monomers such as alkyl acrylates, vinylidene chloride, and n-methylol acrylamide.

Fluorochemical acrylate polymers useful in the present invention are also disclosed in U.S. Pat. Nos. 3,787,351; and 4,795,793.

An inventive tire dressing composition optionally includes a defoaming agent in an amount present to inhibit blister formation in a tire surface dress coating so produced by the inventive composition. Silicone defoamer agents operative herein illustratively include silicone based defoamers, mineral oil based defoamers, and mixtures of foam destroying polymers and hydrophobic solids such as polyureas, as are known to the art. Specific exemplary silicone based defoamers illustratively include silica-filled polydimethylsiloxane and polyether-modified polysiloxanes.

An inventive tire dressing composition optionally includes a surfactant present in an amount to reduce surface tension of the inventive tire dressing composition to an extent such that the composition is able to wet the tire surface. Surfactants operative herein illustratively include nonionic polymeric fluorinated surfactants, anionic phosphonated fluorinated surfactants, nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate.

An inventive tire dressing composition optionally includes a halocarbon or hydrocarbon propellant in instances when an aerosol delivery system of an inventive tire dressing composition is desired. Aerosol propellants operative herein illustratively include difluoroethane, trifluoroethane; alkanes such as butane, pentane, isobutane; propane; ethers such as dimethyl ether and diethyl ether; nitrogen; carbon dioxide; and combinations thereof. The resultant formulation inclusive of a propellant is sealed within a conventional metal aerosol canister and applied by spray application as is conventional to the art.

An inventive tire dressing composition also optionally includes a pigment such as iron oxide, mica, titanium dioxide, stannic oxide, metallic glitter particles such as pigmented polyethylene t-phthalate, cut metalized foils such as aluminized PVC film or the like; organic dyes; fragrances, corrosion inhibitors illustratively including triethanolamine dinonylnaphthalene, boric acid-triethanolamine salt, phosphoric acid-triethanolamine salt, ammonia, triethanolamine, capryloamphoprionate, and mixtures thereof; plasticizers; antimicrobials; and combinations thereof. Typical and preferred formulations according to the present invention are provided in Table 1.

TABLE 1

Inventive Tire Dressing Composition
(amounts in total weight percent exclusive of optional propellant)

| Ingredient | Typical | Preferred |
|---|---|---|
| Silicone Fluid | 2-40 | 5-30 |
| 1,000 CST polydimethylsiloxane | 1-15 | 2-14 |
| 100,000 CST polydimethylsiloxane | 1-25 | 3-16 |
| Fluorinated Acrylate Polymer (I) | 0.01-2 | 0.05-1 |
| Defoamer | 0-1 | 0.01-0.5 |
| Surfactant | 0-5 | 0.1-3 |
| Pigment | 0-3 | 0-1 |
| Dye | 0-1 | 0-0.5 |
| Fragrance | 0-1 | 0-0.5 |
| Antimicrobial | 0-1 | 0-0.2 |
| Anticorrosion | 0-2 | 0-1 |
| Solvent (e.g. pet. distillate) | to 100% | to 100% |

The present invention is further detailed with respect to the following non-limiting examples that are provided to further illustrate the preparation of inventive compositions and certain attributes associated with the resulting coatings on tire surfaces.

Example 1

Using TRICOR systems model 806H hand-held surface analysis system, a tire gloss calibration was performed on all four tires of four different vehicles. These vehicles and the specific tires mounted thereon included 1999 Ford F-250 Pickup Truck (BF Goodrich LT235/85R16-120/116Q); 1996 Ford E-150 Van (Arizonian Silver Edition P235/75R15-105S); 2000 Ford Contour (Kumho P185170R1487TM+S); 1999 Nissan Ultima (Yokohama YK520P195/65R15-91H). Baseline gloss values for each of the tires of the four test vehicles were measured seven times for each vehicle in TRICOR gloss units. For the 28 measurements of gloss used as a baseline for each vehicle, statistics were generated indicating an average pretreatment gloss of 15.04±2.19 with a coefficient of variation of 14.55% and a range of 8.5.

The following generation of baseline values, an inventive tire dressing composition including 11 total weight percent (hereafter "%") of 100,000 centiStokes silicone fluid, 8% 1,000 centiStokes silicone fluid, 0.05% silicone defoamer, 1% of solution of silicone surface additive, 0.1% cherry fragrance and 0.12% of a fluorinated acrylate polymer (I). With respect to fluorinated acrylate polymer (I), included predominantly linear perfluoryl groups as the fluorine content of $R^1$-$R^4$ with Q of $CH_2$ alkylene intermediate groups between the perfluoryl group and the acrylate backbone, along with a quantity of hydroxyl functionality and methyl functionality for $R^1$-$R^4$ such that the fluorinated acrylate polymer is 43% by weight fluorine atoms and an average molecular weight of >100,000 and the linear perfluoroalkyl groups ranging between $C_8$-$C_{14}$.

As a comparative example, the same formulation lacking the fluorinated acrylate polymer (I) is also applied to the four test vehicle tires randomized based on tire location on the vehicles. Quadruple gloss measurements are taken immediately upon coating formation on the vehicle tires and once a week for the next six weeks. The results are summarized in Table 2.

TABLE 2

Average gloss measurement in TRICOR Gloss Units

|  | Inventive Composition | Comparative Composition (w/o fluorinated acrylate) |
|---|---|---|
| As Applied | 189.5 ± 5.2 | 170.3 ± 2.6 |
| Week 1 | 173.0 ± 2.9 | 149.0 ± 4.4 |
| Week 2 | 141.3 ± 2.6 | 119.5 ± 5.4 |
| Week 3 | 107.3 ± 1.7 | 88.8 ± 3.6 |
| Week 4 | 51.3 ± 1.0 | 39.3 ± 1.5 |
| Week 5 | 33.3 ± 0.5 | 14.0 ± 0.8 |
| Week 6 | 14.8 ± 1.0 | — |

The results of the statistical analysis of this data summarized in Table 2 shows both a higher initial gloss to the inventive composition coating and a longer duration of coating adhesion, as compared to the comparative composition lacking the fluorinated acrylate polymer. In fact, the comparative composition testing was terminated after week five because the average gloss value had reverted to baseline values based on the quadruple measurements from each of the four vehicles.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A tire dressing composition comprising:
   at least one silicone fluid having a viscosity of between 40 and 500,000 centiStokes at room temperature;
   a fluorinated acrylate polymer; and
   an organic solvent in which said at least one silicone fluid and said fluorinated acrylate polymer are soluble or suspended, wherein said fluorinated acrylate polymer has the formula (I):

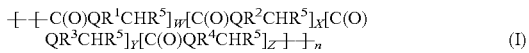

where $R^1$, $R^2$, $R^3$ and $R^4$ are each independently H, OH, $C_1$-$C_{24}$ alkyl, $C_1$-$C_{24}$ fluoroalkyl, $C_1$-$C_{24}$ perfluoroalkyl, with the proviso that the fluorinated acrylate polymer (I) has present at least one of $R^1$-$R^4$ is the $C_1$-$C_{24}$ fluoroalkyl or the $C_1$-$C_{24}$ perfluoroalkyl; Q is —O—, —O—$R^6$, or a nullity; $R^5$ is either H or $CH_3$; $R^6$ is —$SO_2NR^5(CH_2)_mO(O)C$—, —$CONR^5(CH_2)_mO(O)C$—, —$(CH_2)_mO(O)C$—, —$CH_2CH(OH)(CH_2)O(O)C$—, —$CH_2CH(OR^5)(CH_2)O(O)C$—, —$(CH_2)_mC(O)O$—, —$(CH_2)_mSC(O)$—, —$(CH_2)_mO(CH_2)_mO(O)C$—, —$(CH_2)_mS(CH_2)_mO(O)C$—, —$(CH_2)_mO(OCH_2CH_2)_mO(O)C$—, or —$(CH_2)_m(SO_2)$—; W, X, Y, and Z are each independently an integer value of between 0 and 50 inclusive, n is an integer value between 1 and 80; and m is an integer value between 1 and 12.

2. The composition of claim 1 wherein said fluorinated acrylate polymer is between 5 and 30 polymer weight percent fluorine atoms.

3. The composition of claim 1 wherein said fluorinated acrylate polymer is present from 0.05 to 0.20 total weight percent.

4. The composition of claim 1 wherein said fluorinated acrylate polymer forms a colloid or solution with said organic solvent.

5. The composition of claim 1 wherein said at least one silicone fluid is a polydimethyl siloxane.

6. The composition of claim 1 wherein said at least one silicone fluid comprises a first silicone fluid having a first silicone fluid viscosity of between 40 and 500,000 centiStokes; and a second silicone fluid having a second silicone fluid viscosity of between 10,000 and 300,000 centiStokes.

7. The composition of claim 6 wherein said first silicone fluid is a polydimethyl siloxane.

8. The composition of claim 1 wherein said at least one silicone fluid is present from 3 to 40 total weight percent.

9. The composition of claim 6 wherein said first silicone fluid is present from 1 to 12 total weight percent and said second silicone fluid is present from 1 to 12 total weight percent.

10. The composition of claim 1 further comprising a defoamer.

11. The composition of claim 1 further comprising a surfactant.

12. The composition of claim 1 wherein said organic solvent is a majority constituent and is a VOC-exempt solvent.

13. The tire dressing composition of claim 1 further comprising fragrance.

14. A process of dressing a tire surface comprising:
    applying the composition of claim 1 to the tire surface, and allowing said composition to dry to produce a shine of between 180 and 190 gloss units upon drying.

15. The process of claim 14 further comprising maintaining a durability shine of greater than 100 gloss units three weeks after said allowing said composition to dry step.

* * * * *